3,062,443
INDICATING SYSTEM

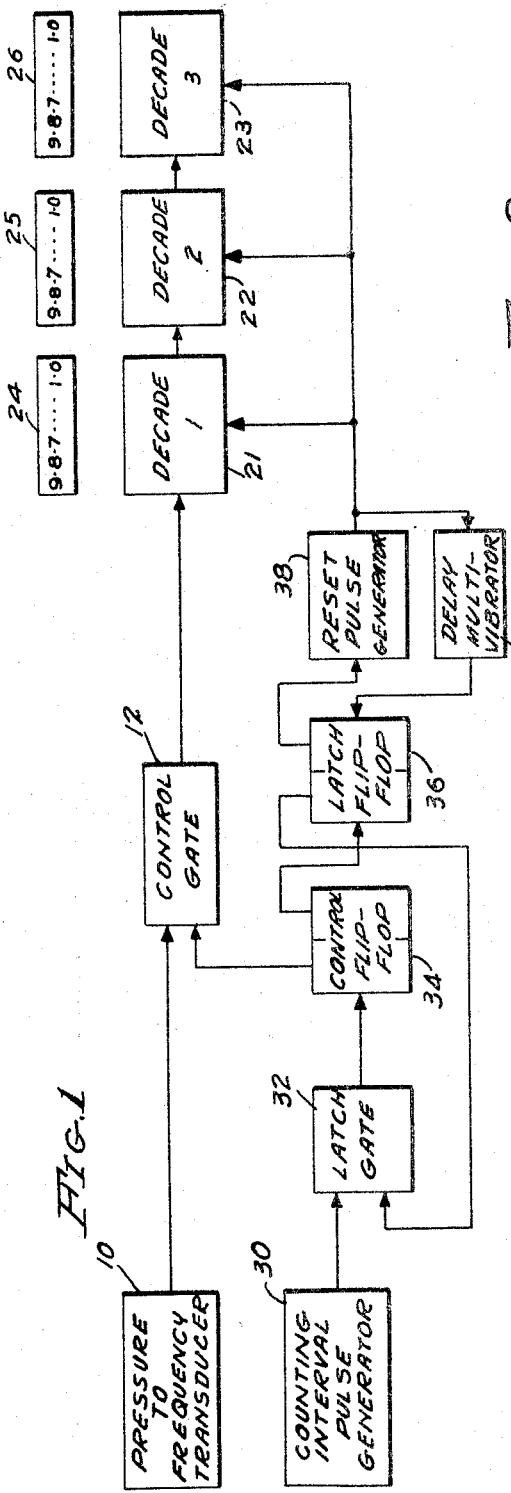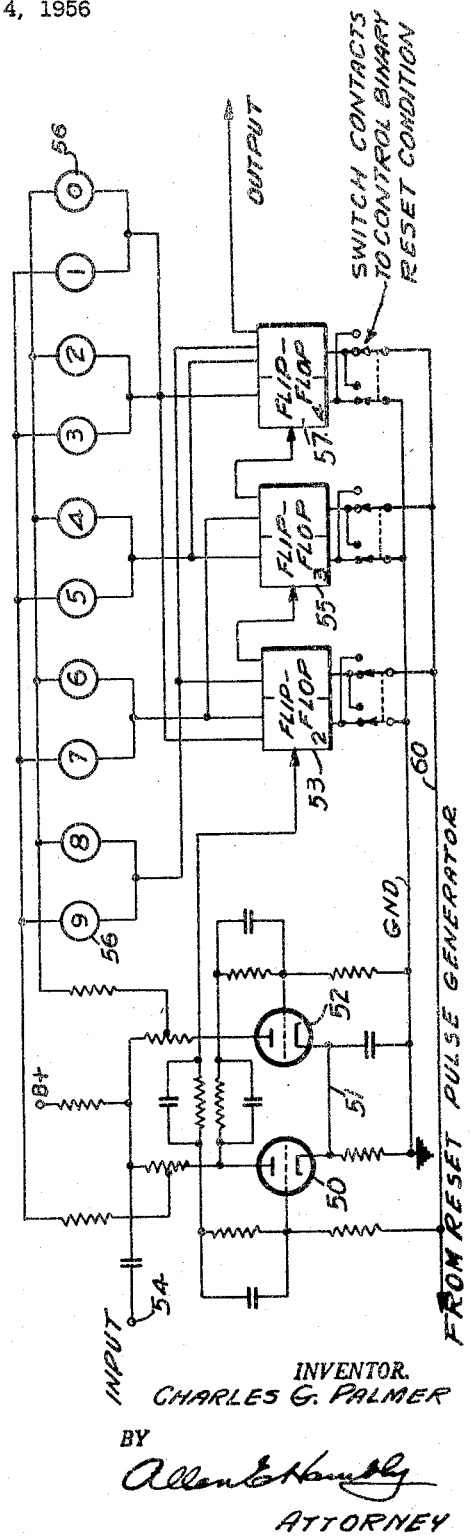

Charles G. Palmer, Santa Ana, Calif., assignor to Borg-Warner Corporation, Chicago, Ill., a corporation of Illinois
Filed Dec. 4, 1956, Ser. No. 626,181
3 Claims. (Cl. 235—132)

In two patents to Frank Reiber, respectively Patent No. 2,412,536, for a Mechanically Tuned Oscillator, issued December 10, 1946, and Patent No. 2,455,021, for a Pressure Meter, issued November 30, 1948, there is described a measuring electromechanical transducer of the type intended wherein the output comprises oscillations having a frequency which varies inversely with the quantity being measured. A direct-frequency-reading indicator requires further computation to determine the amount of the quantity being measured. This is time consuming and may be a source of error.

An object of the present invention is to provide a direct-reading indicator for a measuring transducer having an output which varies inversely with the quantity being measured.

Another object of the present invention is to provide a direct-reading indicator which is novel and useful for a transducer whose output varies inversely with the quantity being measured.

Yet another object of the present invention is the provision of a direct-reading indicator of pressure for an inverse output type of measuring transducer which performs the required inversions to indicate measurements directly with a minimum of complexity.

These and other objects of the present invention are achieved by providing, for the purpose of indicating the quantity being measured by the electromechanical transducer of the type previously mentioned, a decimal counter which is always reset at the beginning of a measuring interval to a value which is the nines complement of the value of the frequency which is provided as output of the transducer at zero pressure. The counter is further modified so that the indicator therefor provides count indicia which are the nines complement of the actual count. With the above modifications, the decimal counter indicates the value of the quantity being measured directly.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIG. 1 is a block diagram of an embodiment of the invention; and

FIGURE 2 shows in more detail how a counter may be modified in accordance with the teachings of this invention.

The transducer previously mentioned by Frank Reiber functions by providing a stretched wire in the frequency-determining circuit of an oscillator. This stretched wire is coupled to one side of the diaphragm, whereby any variations in pressure applied to the other side of that diaphragm cause variations in tension of the stretched wire. These variations in tension alter the frequency which is provided as output of the oscillator. These alterations are inverse to the variations in pressure. Since this inverse relationship exists, it can be seen that if a conventional frequency counter is sought to be used to measure the frequency output from the transducer, the reading will be inverse to that required for directly reading the pressure. This situation may be compensated for by altering the counter so that if the indication made by its visual indicator is the nines complement of the number which is counted and if provision is made to reset the counter to the 9-9-9 position, the desired reading which varies directly with pressure is obtained.

Such an arrangement is obtained by making the changes as shown in FIGURES 1 and 2, namely, to reverse the numbers in the visual indicators of the counter so that when the counter is in the zero-count condition, for a three-decade counter, the number represented will be 9-9-9. With a decimal counter of the type employing four binary stages 51, 53, 55, 57 of the type shown in FIGURE 2, the voltage pattern achieved by the binary stages as they progress through the counting cycle is employed to illuminate in sequence neon glow tubes 56. These may have the count numbers painted thereon. A modification for the purposes of this invention is readily made merely by reversing these tubes so that as the counter progresses through the count, tube 9 is illuminated in the standby, or zero-count condition, 8 for the first count, 7 for the second count, and so forth. Counters of this general type without such modification, of course, are well known and may be found described, for example, in an article by I. E. Grosdoff, entitled Electronic Counters, and published in the RCA Review for September 1946, volume VII, No. 3, page 438.

While different arrangements for electromechanical transducers of the general type herein described can be employed with the present invention, a specific illustration will be given with respect to the transducer, the output oscillations of which are on a frequency on the order of 25,000 cycles per second at a zero-pressure range which decreases to a frequency on the order of 24,000 cycles per second for a maximum pressure. An actual case is shown in the table below, it being understood, of course, that the present invention is not limited to the particular example described hereinafter:

| A | B | C | D |
|---|---|---|---|
| Pressure Percent Full Scale | Frequency Output of Transducer | Nines Complement of Last Three Digits | Counter Indication |
| 000 | 25,136 | 863 | 000 |
| 00.1 | 25,135 | 864 | 001 |
| * | * | * | * |
| 06.9 | 25,067 | 932 | 069 |
| * | * | * | * |
| 38.7 | 24,749 | 250 | 387 |
| * | * | * | * |
| 79.9 | 24,337 | 662 | 799 |
| 80.0 | 24,336 | 663 | 800 |
| * | * | * | * |
| 100.0 | 24,136 | 863 | 1,000 |

It can be seen from the above-noted table that the range in frequency from zero to full scale is 1000 cycles. From this, it may be deduced that it is not necessary to count, or rather, have a counter with the capacity for counting from 24 through 25,000 cycles, since the actual variation in the desired region of pressure variations is only 1000 cycles. Accordingly, it is not necessary to have a counter with a total count capacity of over 25,136 counts. It is only necessary to have a counter with a count capacity of 1000 counts to encompass and indicate the desired pressure variations. The nines-complement indication in column C of the above-noted table effectively inverts the frequency scale. A correction factor is employed so that the counter will indicate 0-0-0 when it has counted 863. This is achieved by presetting the counter to a count of 863 for this particular transducer. By performing this presetting when the frequency of 25,136 is received from the transducer, the counter will indicate 0-0-0, which is the correct pressure indication. Similarly, referring to the table, if the output of the transducer is 24,749 and if the counter is preset at the outset of the measuring time to a zero-count condition of 863, which is the nines complement of the frequency at zero pressure, the counter will indicate a count of 387.

In order to convert the actual count readings to pressure units, the indicated reading must be multiplied by the full-scale pressure. Scale-factor multiplication can be accomplished by changing the time base of the counter; that is, if 1000-cycles-per-second frequency change is equal to a 300-pound-per-square-inch pressure, then employing a one-second time base, the reading of 387 on the counter indicates that 300 must be multiplied by 38.7 percent to obtain the actual pressure. However, if instead of using a one-second time base, there is used a one-third second time base, then the reading on the counter is an actual indication of the pressure.

Reference is now made to FIGURE 1, which shows a block diagram of an embodiment of the invention. A pressure-to-frequency transducer 10 of the type referred to provides output oscillations at a frequency which varies inversely with the variations in pressure being measured. These oscillations are converted by suitable well-known shaping apparatus, not shown, to a pulse train at the frequency which is the same as that of the oscillations. The pressure-to-frequency transducer output is applied to a control gate 12. This control gate has two inputs. One is the input received from the pressure-to-frequency transducer, and the second is an enabling input in the absence of which the control gate does not provide any output. The output of the control gate is applied to a decade counter having three stages 21, 22, 23. As previously pointed out, since the maximum count required for indicating the maximum pressure measured by the transducer, is at most 1000, only three decade stages are required. Each decade stage has a visual indicator 24, 25, 26, which is associated therewith and which has its count indicia arranged to provide an indication which is the nines complement of the count in the counter. Determination of the counting interval is provided by opening the control gate for a desired interval and then closing it.

The apparatus for providing the enabling input to the control gate having a desired duration comprises a counting-interval pulse generator 30, which may include a crystal oscillator having a required number of divider stages and shaping stages to provide a net-resultant comprising an output pulse having a width which is the width of the desired counting interval and having a frequency to provide a desired and viewable count recurrence from the counter. The counting-interval pulse generator's output is applied to a latch gate 32. This latch gate has two inputs, one of which is that from the counting-interval pulse generator and a second input which is an enabling input from a latch flip-flop. In the presence of an enabling input, the latch gate 32 is opened and applies the counting interval pulses to a control flip-flop 34. This control flip-flop supplies an enabling output to the control gate 12. Upon receiving a second output from the latch gate, the control flip-flop is tripped to a second stable condition, wherein it applies its output to a latch flip-flop 36. This latch flip-flop is thereby tripped to a stable condition wherein it provides an output to a reset pulse generator 38 and removes an enabling input to the latch gate 32. Thereby, the latch gate is closed to passage of further pulses from the counting-interval pulse generator.

The reset pulse generator generates a pulse in response to the latch flip-flop output. This is applied to reset the decades to their preset count condition. In the illustration employed, this is the count of 863. As previously pointed out, this preset count is the nines complement of the frequency of oscillation at zero pressure. The reset pulse generator output is also applied to a delay multivibrator 40. This delay multivibrator, after an interval which is determined by its time constant, will provide as output a pulse which is applied to the latch flip-flop to trip it to its second stable condition. Thereby, the latch flip-flop again provides an enabling input to the latch gate. The latch gate is thus opened to transfer the count-interval pulse and apply it to the control flip-flop. The control flip-flop again opens the control gate so that the pulses from the pressure-to-frequency transducer may be counted again.

The gates, flip-flops, pulse generators, and delay multivibrator are all well-known circuitry and need not be described in detail. For example, in the book Electronics, by Elmore and Sands, published by McGraw-Hill Book Company in 1949, on pages 87 and 88 is described and shown a suitable delay multivibrator; suitable pulse generators are shown on pp. 68 et seq.; suitable gates are described and shown on pp. 120 et seq.; and suitable flip-flop circuits are shown on pp. 96–99.

Referring now to FIGURE 2, there may be seen a partial schematic and block diagram of a decade contour modified in accordance with the teachings of this invention. Only the first flip-flop or binary stage is shown in detail. The remainder of the decade counter should be understood to be flip-flop circuits which are substantially identical with the one shown in detail. As is well known, a flip-flop circuit comprises two tubes 50, 52. These two tubes have their grids and anodes cross connected by resistors and condensers, and their cathodes connected together and to ground. The values of the components employed and the biasing potentials applied are such that the tubes are stable in two states, first, with one tube 50 conducting and the other 52 not conducting; and the second stable condition is with the tube 52 conducting and tube 50 not conducting. By applying pulses in sequence to the input terminal 54, the flip-flop may be driven from one stable state to its second stable state.

For every second input pulse to the flip-flop at the front of the counter, a single pulse is applied to the flip-flop which follows it. For every second pulse received by the following flip-flop, another pulse is applied to drive the third flip-flop, and for every two pulses received by the third flip-flop a single-drive pulse is applied to the fourth flip-flop. The sequence described is that for a straightforward binary counter, and therefore the four flip-flop stages will provide a count of 16. However, by employing feedback in the manner taught in the previously noted articles by Grosdoff, the fourth flip-flop stage drives the third and the third flip-flop stage drives the second, so that they will be advanced in a manner to lose size of the sixteen counts which are normally required to drive the flip-flop to a filled condition. The indicators 56 are reversed in the manner shown to provide the nines complement of the count in the counter. A reset bus 60 is provided to reset the flip-flops to the initial predetermined count condition. Reset is achieved by applying the reset pulse to this bus and this bus is then connected to the grids of those tubes in each flip-flop circuit which it is desired to make nonconducting, whereby the flip-flop stages assume a condition representative of the desired predetermined count.

Accordingly, there has been described and shown herein an indicating system for a measuring electromechanical transducer of the type which provides as output oscillations at a frequency which are inversely varied with the variations of the quantity being measured. The intervals of the application of the output of the transducer to a counter may be controlled to provide a desired scale-factor multiplication of the reading shown on the indicator for the counter. The indicator for the counter is arranged to provide the nines-complement indication of the count in the counter. The counter is preset to the nines complement of the frequency of the transducer when it is measuring the zero value of the quantity.

I claim:

1. In a measuring system of the type wherein an electromechanical transducer provides electrical oscillations having a frequency varying inversely with variations in the quantity being measured, apparatus for indicating said quantity comprising a decimal frequency counter, means to preset said counter to the nines complement of the value of the frequency of the output from said transducer at zero value of the quantity being measured, and a visual indicator for said counter actuated responsive thereto, said visual indicator having count indicia which are the nines complement of the sum of the count of said counter added to the preset count, whereby such quantity can be accurately indicated over the entire range of said decimal counter.

2. An indicator for a measuring transducer which provides as output electrical oscillations having a frequency varying inversely with variations in the characteristic being measured, said indicator comprising a decimal frequency counter, means to preset said counter to the nines complement of the frequency of said electrical oscillations at minimal value of said characteristic, and a visual indicator actuated by said counter to indicate the nines complement of the sum of the count of said counter added to the present count, to thereby provide accurate indication of said characteristic over the entire range of said decimal counter.

3. In a measuring system of the type wherein an electromechanical transducer provides electrical oscillations having a frequency varying inversely with variations in the quantity being measured, apparatus for indicating said quantity comprising a decimal frequency counter, means to preset said counter to the nines complement of the value of the frequency of the output from said transducer at a predetermined value of the quantity being measured, and a visual indicator for said counter actuated responsive thereto, said visual indicator having count indicia which are the nines complement of the sum of the count of said counter added to the preset count, whereby such quantity can be accurately measured and indicated over the entire range of said decimal counter.

References Cited in the file of this patent

UNITED STATES PATENTS

| | | |
|---|---|---|
| 2,455,021 | Reiber | Nov. 30, 1948 |
| 2,493,627 | Grosdoff | Jan. 3, 1950 |
| 2,500,294 | Phelps | Mar. 14, 1950 |
| 2,510,485 | Vossberg | June 6, 1950 |
| 2,540,442 | Grosdoff | Feb. 6, 1951 |
| 2,560,968 | MacSorley | July 17, 1951 |
| 2,576,900 | Brockman | Nov. 27, 1951 |
| 2,651,204 | Dickinson | Sept. 8, 1953 |
| 2,703,202 | Cartwright | Mar. 1, 1955 |
| 2,764,350 | Braatz | Sept. 25, 1956 |
| 2,769,595 | Bagley | Nov. 6, 1956 |
| 2,803,405 | Howell | Aug. 20, 1957 |
| 2,813,676 | Boyer et al. | Nov. 19, 1957 |